(12) United States Patent
Nagase

(10) Patent No.: US 11,011,745 B2
(45) Date of Patent: May 18, 2021

(54) ANODE MIXTURE

(71) Applicant: TOYOTA JIDOSHA KABUSHIKI KAISHA, Toyota (JP)

(72) Inventor: Hiroshi Nagase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/576,143

(22) Filed: Sep. 19, 2019

(65) Prior Publication Data

US 2020/0099044 A1 Mar. 26, 2020

(30) Foreign Application Priority Data

Sep. 25, 2018 (JP) .............................. JP2018-179163

(51) Int. Cl.
*H01M 4/36* (2006.01)
*H01M 4/485* (2010.01)
*H01M 10/0525* (2010.01)
*H01M 4/587* (2010.01)
*H01M 4/02* (2006.01)

(52) U.S. Cl.
CPC ........... *H01M 4/364* (2013.01); *H01M 4/485* (2013.01); *H01M 4/587* (2013.01); *H01M 10/0525* (2013.01); *H01M 2004/027* (2013.01)

(58) Field of Classification Search
CPC .. H01M 4/364; H01M 4/485; H01M 10/0525; H01M 4/587; H01M 2004/027; H01M 4/387; H01M 4/386; Y02E 60/10
See application file for complete search history.

(56) References Cited

U.S. PATENT DOCUMENTS

| | | | |
|---|---|---|---|
| 2013/0266867 A1* | 10/2013 | Chang | H01M 4/366 429/221 |
| 2014/0197800 A1* | 7/2014 | Nagase | H01M 10/052 320/136 |
| 2015/0280276 A1* | 10/2015 | Lemke | H01M 4/525 361/679.55 |
| 2016/0233553 A1* | 8/2016 | Yamasaki | H01M 4/13 |
| 2016/0268589 A1 | 9/2016 | Do et al. | |
| 2018/0013136 A1 | 1/2018 | Mizuno | |

FOREIGN PATENT DOCUMENTS

| | | |
|---|---|---|
| JP | 2016-81881 A | 5/2016 |
| JP | 2016-536737 A | 11/2016 |
| JP | 2016-201310 A1 | 12/2016 |

* cited by examiner

*Primary Examiner* — Andrew J. Oyer
(74) *Attorney, Agent, or Firm* — Sughrue Mion, PLLC

(57) ABSTRACT

To provide an anode mixture configured to, when used in an all-solid-state battery, decrease the resistance of the all-solid-state battery and increase the charging performance of the all-solid-state battery, wherein the anode mixture is an anode mixture for an all-solid-state battery comprising an anode comprising an anode mixture layer; wherein the anode mixture contains a first anode active material and a second anode active material; and wherein a difference between a reaction potential of the first anode active material with respect to lithium metal and a reaction potential of the second anode active material with respect to lithium metal, is 1.0 V or more.

20 Claims, 3 Drawing Sheets

ANODE MIXTURE

TECHNICAL FIELD

The disclosure relates to an anode mixture.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses an all-solid-state lithium secondary battery capable of exhibiting high battery characteristics (cycle characteristics, battery resistance and negative electrode active material utilization rate) even at high temperature (150° C.), the all-solid-state lithium secondary battery comprising $Li_4Ti_5O_{12}$, lithium, silicon, graphite, hard carbon or soft carbon as an anode active material.

Patent Literature 2 discloses a nonaqueous electrolyte secondary battery which allows a high energy density to be stably ensured over a long period of time, the nonaqueous electrolyte secondary battery comprising a lithium titanium complex oxide and SiO as a cathode active material.

Patent Literature 3 discloses an anode for lithium secondary batteries, the anode comprising lithium titanium oxide as a low-temperature additive.

Patent Literature 1: Japanese Patent Application Laid-Open (JP-A) No. 2016-201310

Patent Literature 2: JP-A No. 2016-081881

Patent Literature 3: Japanese translation of PCT International Application No. 2016-536737

Anodes as disclosed in prior art references, have a problem in that they show poor lithium ion occlusion performance when used in an all-solid-state battery.

SUMMARY

In light of the above circumstance, an object of the disclosed embodiments is to provide an anode mixture configured to, when used in an all-solid-state battery, decrease the resistance of the all-solid-state battery and increase the charging performance of the all-solid-state battery.

In a first embodiment, there is provided an anode mixture, wherein the anode mixture is an anode mixture for an all-solid-state battery comprising an anode comprising an anode mixture layer;

wherein the anode mixture contains a first anode active material and a second anode active material; and wherein a difference between a reaction potential of the first anode active material with respect to lithium metal and a reaction potential of the second anode active material with respect to lithium metal, is 1.0 V or more.

The anode mixture may be an anode mixture wherein the first anode active material is at least one selected from the group consisting of carbon, Si and Sn; wherein the second anode active material is $Li_4Ti_5O_{12}$; and wherein, when a total of a mass of the first anode active material contained in the anode mixture and a mass of the second anode active material contained in the anode mixture, is determined as 100 mass %, a content ratio of the second anode active material is from 5 mass % to 15 mass %.

According to the disclosed embodiments, an anode mixture configured to, when used in an all-solid-state battery, decrease the resistance of the all-solid-state battery and increase the charging performance of the all-solid-state battery, can be provided.

BRIEF DESCRIPTION OF THE DRAWINGS

In the accompanying drawings.

DETAILED DESCRIPTION

Figure 1:
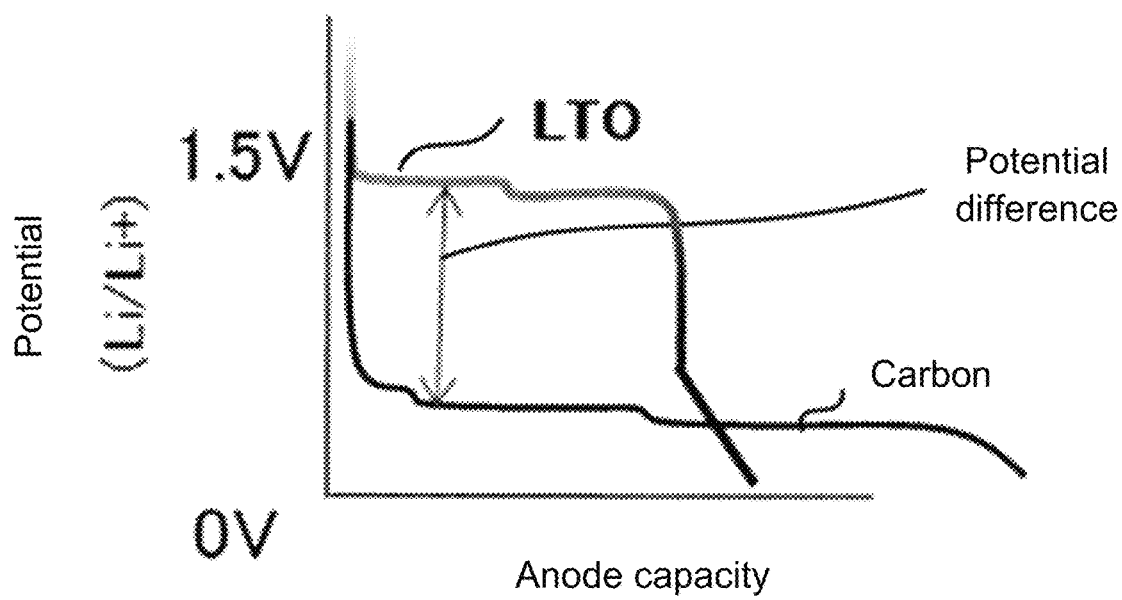
FIG. 1 is a view showing a charge curve showing a relationship between the capacity of the anode and the potential of the first anode active material (carbon), and a charge curve showing a relationship between the capacity of the anode and the potential of the second anode active material (LTO), the charge curves being overlapped on each other.

The anode mixture of the disclosed embodiments is an anode mixture wherein the anode mixture is an anode mixture for an all-solid-state battery comprising an anode comprising an anode mixture layer; wherein the anode mixture contains a first anode active material and a second anode active material; and wherein a difference between a reaction potential of the first anode active material with respect to lithium metal and a reaction potential of the second anode active material with respect to lithium metal, is 1.0 V or more.

A major problem with secondary batteries is insufficient quick charging performance. One cause for the problem is that the lithium occlusion performance of their anode is low.

In all-solid-state batteries, due to the presence of pores or a binder, lithium ion conducting paths in the electrode thickness direction, are blocked. Accordingly, in all-solid-state batteries, lithium ion conduction in the electrode thickness direction is poor compared to liquid batteries. Especially when the electrode thickness is large, an electrode reaction that is non-uniform in the thickness direction, remarkably occurs, and such a phenomenon is caused in the anode, that while the cathode-side anode active material in the anode is likely to cause a reaction, the anode current collector-side anode active material in the anode is less likely to cause a reaction.

When a large current is passed through a battery during battery charging, in the anode, the anode active material on the side close to the cathode, is highly likely to cause a reaction. Accordingly, the anode fails to develop a normal Li occlusion reaction, resulting in the irreversible capacity of the battery.

Accordingly, to increase the charging performance of all-solid-state batteries, it is needed to decrease electrode resistance and to increase lithium diffusivity in the electrode thickness direction.

It was found that by using a mixture of two or more kinds of anode active materials in the anode of an all-solid-state battery, which are different in reaction potential with respect to lithium metal, lithium diffusion in the anode can be promoted, and the charging performance of the all-solid-state battery can be increased.

It is presumed that this is because, due to the presence of the two or more kinds of anode active materials in the anode, which are different in reaction potential with respect to lithium metal, the difference in reaction potential gives an impetus to lithium diffusion in the anode.

The anode mixture contains the first anode active material and the second anode active material. As needed, it contains a solid electrolyte, an electroconductive material, a binder, etc.

For the difference between the reaction potential of the first anode active material with respect to lithium metal and the reaction potential of the second anode active material with respect to lithium metal, the lower limit of the difference may be 1.0 V or more. On the other hand, the upper limit is not particularly limited. From the viewpoint of obtaining desired battery electromotive force, the upper limit may be 2.0 V or less, or it may be 1.6 V or less. Since the reaction potential difference is 1.0 V or more, an impetus to lithium diffusion in the anode mixture layer can be provided, and lithium diffusion in the anode mixture layer can be promoted.

The first anode active material may be at least one selected from the group consisting of carbon (reaction potential: 0.15 V vs. Li/Li$^+$ to 0.05 V vs. Li/Li$^+$), Si (reaction potential: 0.35 V vs. Li/Li$^+$ to 0.05 V vs. Li/Li$^+$) and Sn (reaction potential: 0.65 V vs. Li/Li$^+$ to 0.35 V vs. Li/Li$^+$).

The second anode active material may be $Li_4Ti_5O_{12}$ (hereinafter may be referred to as LTO). The reaction potential of the LTO is from 1.50 V vs. Li/Li$^+$ to 1.65 V vs. Li/Li$^+$.

The reaction potential of the anode active material means a potential at which, on the basis of lithium, the anode active material reacts with lithium and allows lithium insertion/extraction during battery charging/discharging, or a potential at which the anode active material is alloyed with lithium.

For example, the reaction potential of the anode active material can be calculated by measuring the open circuit voltage (OCV) of a battery comprising an anode that contains the anode active material to be measured. Also, the reaction potential of the anode active material can be measured as follows: an anode containing the anode active material to be measured, is observed by a three-electrode method to obtain a charge-discharge curve, and the open circuit potential (OCP) of the anode active material during battery charging/discharging, can be measured from the charge-discharge curve. Then, the measured open circuit potential can be used as the reaction potential of the anode active material.

Also, the reaction potential of the anode active material may be an average of OCP values of anode capacities that are measured as above, in increments of 5%, etc., in an anode capacity range in which the anode active material allows lithium insertion/extraction, or in an anode capacity range in which the anode active material can be alloyed with lithium.

Accordingly, in the disclosed embodiments, the difference between the reaction potential of the first anode active material and the reaction potential of the second anode active material, may be a difference between the average of the reaction potentials of the first anode active material and the average of the reaction potentials of the second anode active material (i.e., a difference in average reaction potential).

FIG. 1 is a view showing a charge curve showing a relationship between the capacity of the anode and the potential of the first anode active material (carbon), and a charge curve showing a relationship between the capacity of the anode and the potential of the second anode active material (LTO), the charge curves being overlapped on each other.

As shown in FIG. 1, it is presumed that the potential difference between the potential of the LTO and that of the carbon, gives an impetus to lithium diffusion in the anode mixture layer, thereby promoting lithium diffusion in the anode mixture layer.

The charge curves shown in FIG. 1 are those obtained by measuring the anode containing the anode active material by the three-electrode method.

The form of the first and second anode active materials is not particularly limited. For example, it may be a particulate form or a thin film form.

When the first and second anode active materials are in a particulate form, the average particle diameter ($D_{50}$) of the anode active material particles may be 1 nm or more and 100 µm or less, or it may be 10 nm or more and 30 µm or less, for example.

For the content ratio of the second anode active material when the total of the mass of the first anode active material contained in the anode mixture and the mass of the second anode active material contained in the anode mixture, is determined as 100 mass % (i.e., [the second anode active material/(the first anode active material+ the second anode active material)]×100), the lower limit of the content ratio may be more than 0 mass %, or it may be 5 mass % or more. On the other hand, the upper limit may be less than 20 mass %, or it may be 15 mass % or less.

In the case where the content of the second anode active material is 20 mass % or more and the second anode active material is LTO, the specific capacity of the LTO is about 165 mAh/g. This is smaller than the case where the first anode active material is carbon and the specific capacity of the carbon is 370 mAh/g. Accordingly, if the amount of the LTO used as the second anode active material is too large, increasing the thickness of the anode mixture layer, or decreasing the content ratio of the solid electrolyte in the anode mixture layer to increase the content ratio of the anode active material in the anode mixture layer, is needed to obtain the same capacity as the capacity of the case where only carbon is used as the anode. In both cases, the resistance of the anode has a tendency to increase. Accordingly, if the amount of the LTO used as the second anode active material in the anode mixture layer, is too large, the resistance of the anode increases higher than the lithium diffusivity increasing effect that is exerted by the use of the LTO.

The solid electrolyte may be selected from materials listed below as the examples of the solid electrolyte that is contained in the solid electrolyte layer described below.

The electroconductive material and binder may be selected from the materials listed below as the examples of the electroconductive material and binder that are contained in the cathode mixture layer described below.

The method for producing the anode mixture of the disclosed embodiments, is not particularly limited. The anode mixture of the disclosed embodiments is obtained by mixing the first anode active material, the second anode active material and, as needed, other materials. The method for mixing them is not particularly limited.

The form of the anode mixture may be a particulate form, a pressed powder form, or a paste form (i.e., anode mixture paste). When the anode mixture is in a pressed powder form, it may be used as it is as the anode mixture layer. When the anode mixture is in a paste form, the anode mixture paste may be applied to one surface of the below-described anode current collector or solid electrolyte layer and dried to form the anode mixture layer.

The anode mixture of the disclosed embodiments is used as a material for the anode mixture layer contained in the anode of the all-solid-state battery.

In general, the all-solid-state battery used in the disclosed embodiments comprises a cathode comprising a cathode mixture layer, an anode comprising the anode mixture layer that contains the anode mixture of the disclosed embodiments, and a solid electrolyte layer disposed between the cathode mixture layer and the anode mixture layer.

Since the all-solid-state battery of the disclosed embodiments comprises the anode comprising the anode mixture layer that contains the anode mixture of the disclosed embodiments, the resistance of the all-solid-state battery can be decreased, and the charging performance of the all-solid-state battery can be increased.

Figure 2:
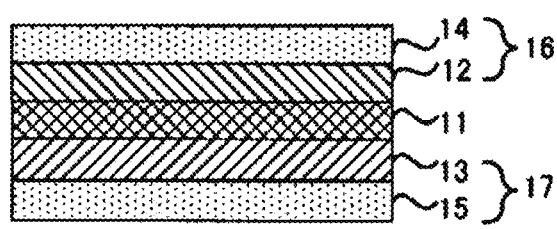
FIG. 2 is a schematic sectional view of an example of the all-solid-state battery used in the disclosed embodiments.

FIG. 2 is a schematic sectional view of an example of the all-solid-state battery used in the disclosed embodiments.

As shown in FIG. 2, an all-solid-state battery 100 comprises a cathode 16 comprising a cathode mixture layer 12 and a cathode current collector 14, an anode 17 comprising an anode mixture layer 13 and an anode current collector 15, and a solid electrolyte layer 11 disposed between the cathode 16 and the anode 17.

[Cathode]

The cathode comprises at least the cathode mixture layer and the cathode current collector.

The cathode mixture layer contains a cathode active material. As optional components, the cathode mixture layer may contain a solid electrolyte, an electroconductive material and a binder.

The type of the cathode active material is not particularly limited. As the cathode active material, examples include, but are not limited to, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. It may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. The lower limit of the thickness of the coating layer may be 0.1 nm or more, or it may be 1 nm or more, for example. On the other hand, the upper limit may be 100 nm or less, or it may be 20 nm or less, for example. The coverage of the coating layer on the cathode active material surface may be 70% or more, or it may be 90% or more, for example.

As the solid electrolyte contained in the cathode mixture layer, examples include, but are not limited to, the same materials as the solid electrolytes that may be used in the below-described solid electrolyte layer.

The content of the solid electrolyte in the cathode mixture layer is not particularly limited.

As the electroconductive material, examples include, but are not limited to, a carbonaceous material and a metal material. The carbonaceous material may be at least one selected from the group consisting of carbon nanotube (CNT), carbon nanofiber (CNF) and carbon blacks such as acetylene black (AB) and Ketjen Black (KB). The carbon nanotube (CNT) and carbon nanofiber (CNF) may be vapor-grown carbon fiber (VGCF).

The content of the electroconductive material in the cathode mixture layer is not particularly limited.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the cathode mixture layer is not particularly limited.

The thickness of the cathode mixture layer is not particularly limited.

The method for forming the cathode mixture layer is not particularly limited. As the method, examples include, but are not limited to, pressure-forming a powdered cathode mixture that contains the cathode active material and, as needed, other components. Another example of the method for forming the cathode mixture layer is as follows: a cathode mixture paste containing the cathode active material, a solvent and, as needed, other components, is prepared; the cathode mixture paste is applied on one surface of the cathode current collector or solid electrolyte layer; and the applied cathode mixture paste is dried, thereby forming the cathode mixture layer. As the solvent used in the cathode mixture paste, examples include, but are not limited to, butyl acetate, heptane and N-methyl-2-pyrrolidone. The method for applying the cathode mixture paste on one surface of the cathode current collector or solid electrolyte layer, is not particularly limited. As the method, examples include, but are not limited to, a doctor blade method, a metal mask printing method, an electrostatic coating method, a dip coating method, a spray coating method, a roller coating method, a gravure coating method and a screen printing method.

As the cathode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Solid Electrolyte Layer]

The solid electrolyte layer contains at least a solid electrolyte.

As the solid electrolyte, examples include, but are not limited to, an oxide-based solid electrolyte and a sulfide-based solid electrolyte. From the viewpoint of increasing buttery power output, the solid electrolyte may be a sulfide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. Of them, the sulfide-based solid electrolyte may be LiI—LiBr—$Li_2S$—$P_2S_5$ or LiI—$Li_2S$—$P_2S_5$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds.

The sulfide-based solid electrolytes may be a glass, a crystal material or a glass ceramic. The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented. The glass ceramic can be obtained by heating a glass. The crystal material can be obtained by developing a solid state reaction of the raw material composition, for example.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

The form of the solid electrolyte may be a particulate form.

The average particle diameter ($D_{50}$) of the solid electrolyte particles is not particularly limited.

As the solid electrolyte, one or more kinds of solid electrolytes may be used. In the case of using two or more kinds of solid electrolytes, they may be mixed together, or they may be formed into layers to obtain a multi-layered structure.

From the viewpoint of exerting plasticity, etc., a binder for binding the solid electrolyte particles can be incorporated in the solid electrolyte layer. As the binder, examples include, but are not limited to, a binder that can be incorporated in the above-described cathode. However, the content of the binder in the solid electrolyte layer may be 5 mass % or less, from the viewpoint of preventing excessive aggregation of the solid electrolyte, enabling the formation of the solid electrolyte layer in which the solid electrolyte is uniformly dispersed, etc., for the purpose of easily achieving high power output.

The thickness of the solid electrolyte layer is not particularly limited. It is generally 0.1 μm or more and 1 mm or less.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when the particle diameters of particles are arranged in ascending order, the accumulated volume of the particles is half (50%) the total volume of the particles (volume average diameter).

[Anode]

The anode comprises the anode mixture layer of the disclosed embodiments and an anode current collector.

The anode mixture layer contains the anode mixture of the disclosed embodiments.

The thickness of the anode mixture layer is not particularly limited. It may be from 0.1 μm to 500 μm.

The method for forming the anode mixture layer is not particularly limited. As the method, examples include, but are not limited to, pressure-forming a powdered anode mixture. Another example of the method for producing the anode mixture layer is as follows: an anode mixture paste containing the first anode active material, the second anode active material, a solvent and, as needed, other components, is prepared; the anode mixture paste is applied on one surface of the anode current collector or solid electrolyte layer; and the applied anode mixture paste is dried, thereby forming the anode mixture layer. The solvent used in the anode mixture paste may be the same solvent as the one used in the cathode mixture paste. The method for applying the anode mixture paste to one surface of the anode current collector or solid electrolyte layer, may be the same method as the method for applying the cathode mixture paste.

As the anode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the anode current collector is not particularly limited. As the form, examples include, but are not limited to, various kinds of forms such as a foil form and a mesh form.

The form of the whole anode is not particularly limited. It may be a sheet form. In this case, the thickness of the whole anode is not particularly limited. It can be determined depending on desired performance.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, a lithium ion battery which is charged and discharged by lithium ion transfer between the cathode and the anode, a sodium battery, a magnesium battery and a calcium battery. The all-solid-state battery may be a lithium ion battery. Also, the all-solid-state battery may be a primary or secondary battery.

As the form of the all-solid-state battery, examples include, but are not limited to, a coin form, a laminate form, a cylindrical form and a square form.

The method for producing the all-solid-state battery of the disclosed embodiments, is as follows, for example. First, the solid electrolyte layer is formed by pressure-forming a powdered solid electrolyte material. Next, the cathode mixture layer is obtained by pressure-forming the powdered cathode mixture on one surface of the solid electrolyte layer. Then, the anode mixture layer is obtained by pressure-forming the powdered anode mixture on the other surface of the solid electrolyte layer. Then, a cathode mixture layer-solid electrolyte layer-anode mixture layer assembly thus obtained, can be used as the all-solid-state battery.

In this case, the press pressure applied for pressure-forming the powdered solid electrolyte material, the powdered cathode mixture and the powdered anode mixture, is generally about 1 MPa or more and about 600 MPa or less.

The pressure applying method is not particularly limited. As the method, examples include, but are not limited to, applying pressure by use of a plate press machine, a roll press machine, etc.

Another example of the method for forming the all-solid-state battery of the disclosed embodiments, is as follows. First, the solid electrolyte layer is formed by pressure-forming the powdered solid electrolyte material. The cathode mixture paste is applied on one surface of the cathode current collector. The applied cathode mixture paste is dried, thereby obtaining the cathode comprising the cathode mixture layer. Then, the anode mixture paste is applied on one surface of the anode current collector. The applied anode mixture paste is dried, thereby obtaining the anode comprising the anode mixture layer. The solid electrolyte layer is disposed between the cathode mixture layer and the anode mixture layer to ensure that the cathode current collector, the cathode mixture layer, the solid electrolyte layer, the anode mixture layer and the anode current collector are arranged in this order, thereby obtaining the all-solid-state battery.

The production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

EXAMPLES

Example 1

[Synthesis of a Solid Electrolyte]
As raw materials for a solid electrolyte, 0.550 g of $Li_2S$ (manufactured by Furuuchi Chemical Corporation), 0.887 g of $P_2S_5$ (manufactured by Aldrich), 0.285 g of LiI (manufactured by Nippoh Chemicals Co., Ltd.) and 0.277 g of LiBr (manufactured by Kojundo Chemical Laboratory Co., Ltd.) were weighed out. They were put in an agate mortar and mixed in the mortar with a pestle for 5 minutes, thereby obtaining a mixture. The mixture and 4 g of dehydrated heptane (manufactured by Kanto Chemical Co., Inc.) were put in a container and subjected to mechanical milling for 40 hours by use of a planetary ball mill, thereby obtaining LiI—LiBr—$Li_2S$—$P_2S_5$ as the solid electrolyte.

[Production of an Anode Mixture Paste]
The following raw materials were put in a polypropylene container.
First anode active material: Carbon particles (manufactured by Mitsubishi Chemical Corporation)
Second anode active material: Lithium titanate ($Li_4Ti_5O_{12}$ manufactured by Ishihara Sangyo Kaisha, Ltd.)
Solid electrolyte: LiI—LiBr—$Li_2S$—$P_2S_5$ (0.776 g)
Other raw materials: PVdF (0.02 g, manufactured by Kureha Corporation) and butyl butyrate (2.4 g, manufactured by Nacalai Tesque, Inc.)

These raw materials were mixed by use of an ultrasonic homogenizer ("UH-50" manufactured by SMT). A mixture thus obtained was used as an anode mixture paste.

The total of the first and second anode active materials contained in the anode mixture paste, was controlled to 1.16 g to ensure that when the total of the mass of the first anode active material and the mass of the second anode active material, was determined as 100 mass %, the content ratio of the second anode active material was 5 mass %. That is, 1.102 g of the first anode active material and 0.058 g of the second anode active material were used.

[Production of a Cathode Mixture Paste]
The following raw materials were put in a polypropylene container.
Cathode active material: $LiNbO_3$-coated $LiNi_{1/3}Co_{1/3}Mn_{1/3}O_2$ (1.5 g, manufactured by Nichia Corporation)
Electroconductive material: VGCF (0.023 g, manufactured by Showa Denko K. K.)
Solid electrolyte: LiI—LiBr—$Li_2S$—$P_2S_5$ (0.239 g)
Other raw materials: PVdF (0.013 g, manufactured by Kureha Corporation) and butyl butyrate (0.8 g, manufactured by Nacalai Tesque, Inc.)

These raw materials were mixed by use of the ultrasonic homogenizer ("UH-50" manufactured by SMT). A mixture thus obtained was used as a cathode mixture paste.

[Production of a Paste for Forming a Solid Electrolyte Layer]
A heptane solution containing heptane and 5 mass % of a butadiene rubber-based binder, and a solid electrolyte (LiI—$Li_2S$—$P_2S_5$-based glass ceramic particles having an average particle diameter of 2.5 μm) were put in a polypropylene container. These raw materials were mixed for 30 seconds by use of an ultrasonic disperser. Next, the container was shaken for three minutes by use of a shaking device, thereby obtaining a paste for forming a solid electrolyte layer.

[Production of a cathode and an anode]
An aluminum foil was used as a cathode current collector. Using an applicator, the cathode mixture paste was applied on one surface of the aluminum foil by a doctor blade method. The mass per unit area of the cathode mixture obtained by drying the applied cathode mixture paste, was 18 mg/cm$^2$. The applied cathode mixture paste was dried on a hot plate at 100° C. for 30 minutes, thereby obtaining a cathode in which a cathode mixture layer was formed on one surface of the aluminum foil.

A copper foil was used as an anode current collector. In the same manner as above, an anode mixture paste was applied on one surface of the copper foil. The mass per unit area of the anode mixture obtained by drying the applied anode mixture paste, was controlled to ensure that the capacity ratio of a thus-obtained anode to the cathode was 1.3. The applied anode mixture paste was dried on the hot plate at 100° C. for 30 minutes, thereby obtaining an anode in which an anode mixture layer was formed on one surface of the copper foil.

The theoretical capacity of the carbon used as the first anode active material, was determined as 370 mAh/g, and the theoretical capacity of the LTO used as the second anode active material, was determined as 165 mAh/g. The capacity of the anode was calculated from the content ratio of the first anode active material and that of the second anode active material.

[Application of the Paste for Forming the Solid Electrolyte Layer (Cathode Side)]
The cathode obtained above was pressed. By use of a die coater, the paste for forming the solid electrolyte layer was applied on the surface of the cathode mixture layer of the pressed cathode. The applied paste was dried on the hot plate at 100° C. for 30 minutes. Then, the cathode was roll-pressed at a pressure of 2 ton/cm$^2$ (≈196 MPa), thereby obtaining a cathode side laminate in which a solid electrolyte layer was formed on the cathode mixture layer.

[Application of the Paste for Forming the Solid Electrolyte Layer (Anode Side)]
The anode obtained above was pressed. By use of the die coater, the paste for forming the solid electrolyte layer was applied on the surface of the anode mixture layer of the pressed anode. The applied paste was dried on the hot plate at 100° C. for 30 minutes. Then, the anode was roll-pressed at a pressure of 2 ton/cm$^2$ (≈196 MPa), thereby obtaining an anode side laminate in which a solid electrolyte layer was formed on the anode mixture layer.

[Production of an all-Solid-State Lithium Ion Secondary Battery]

Each of the cathode side laminate and the anode side laminate was die-cut into a rectangular form. The paste for forming the solid electrolyte layer was disposed between the solid electrolyte layer of the cathode side laminate in the rectangular form and the solid electrolyte layer of the anode side laminate in the rectangular form. Then, the solid electrolyte layer of the cathode side laminate in the rectangular form and the solid electrolyte layer of the anode side laminate in the rectangular form, were stacked to be attached, thereby obtaining a laminate. Then, the laminate was pressed at a pressure of 2 ton/cm$^2$ (≈196 MPa) at a temperature 130° C., thereby obtaining a power generation unit in which a cathode, a solid electrolyte layer and an anode were arranged in this order.

The power generation unit was encapsulated by a laminate resin and confined at 1 Mpa, thereby obtaining an all-solid-state lithium ion secondary battery for evaluation (evaluation battery).

Example 2

An anode mixture paste and an all-solid-state lithium ion secondary battery were obtained in the same manner as Example 1, except that in the "Production of an anode mixture paste", when the total of the mass of the first anode active material contained in the anode mixture paste and the mass of the second anode active material contained in the anode mixture paste, was determined as 100 mass %, the content ratio of the second anode active material was 10 mass %.

Example 3

An anode mixture paste and an all-solid-state lithium ion secondary battery were obtained in the same manner as Example 1, except that in the "Production of an anode mixture paste", when the total of the mass of the first anode active material contained in the anode mixture paste and the mass of the second anode active material contained in the anode mixture paste, was determined as 100 mass %, the content ratio of the second anode active material was 15 mass %.

Example 4

An anode mixture paste and an all-solid-state lithium ion secondary battery were obtained in the same manner as Example 1, except that in the "Production of an anode mixture paste", when the total of the mass of the first anode active material contained in the anode mixture paste and the mass of the second anode active material contained in the anode mixture paste, was determined as 100 mass %, the content ratio of the second anode active material was 2.5 mass %.

Example 5

An anode mixture paste and an all-solid-state lithium ion secondary battery were obtained in the same manner as Example 1, except that in the "Production of an anode mixture paste", when the total of the mass of the first anode active material contained in the anode mixture paste and the mass of the second anode active material contained in the anode mixture paste, was determined as 100 mass %, the content ratio of the second anode active material was 17.5 mass %.

Example 6

An anode mixture paste and an all-solid-state lithium ion secondary battery were obtained in the same manner as Example 1, except that in the "Production of an anode mixture paste", when the total of the mass of the first anode active material contained in the anode mixture paste and the mass of the second anode active material contained in the anode mixture paste, was determined as 100 mass %, the content ratio of the second anode active material was 20 mass %.

Comparative Example 1

An anode mixture paste and an all-solid-state lithium ion secondary battery were obtained in the same manner as Example 1, except that in the "Production of an anode mixture paste", the second anode active material was not used.

[Resistance Measurement]

Before resistance measurement, the all-solid-state lithium ion secondary battery (evaluation battery) of Example was subjected to 5 charge-discharge cycles with constant current and constant voltage (CC-CV) in the following conditions.

Temperature: 25° C.
Charge-discharge rate: 0.1 C
Battery voltage range: 4.35 V to 3.0 V The voltage of the evaluation battery was controlled to reach a SOC of 30%. A decrease in voltage (ΔV) which was observed when the evaluation battery was charged at a charge rate of 2 C for 10 seconds, was divided by a current value at which the evaluation battery was charged, thereby calculating the resistance value of the evaluation battery at a SOC of 30%.

In the same manner, the voltage of the evaluation battery was controlled to reach a SOC of 70%. Then, a decrease in voltage (ΔV) which was observed when the evaluation battery was charged at a charge rate of 2 C for 10 seconds, was divided by a current value at which the evaluation battery was charged, thereby calculating the resistance value of the evaluation battery at a SOC of 70%.

Figure 3:
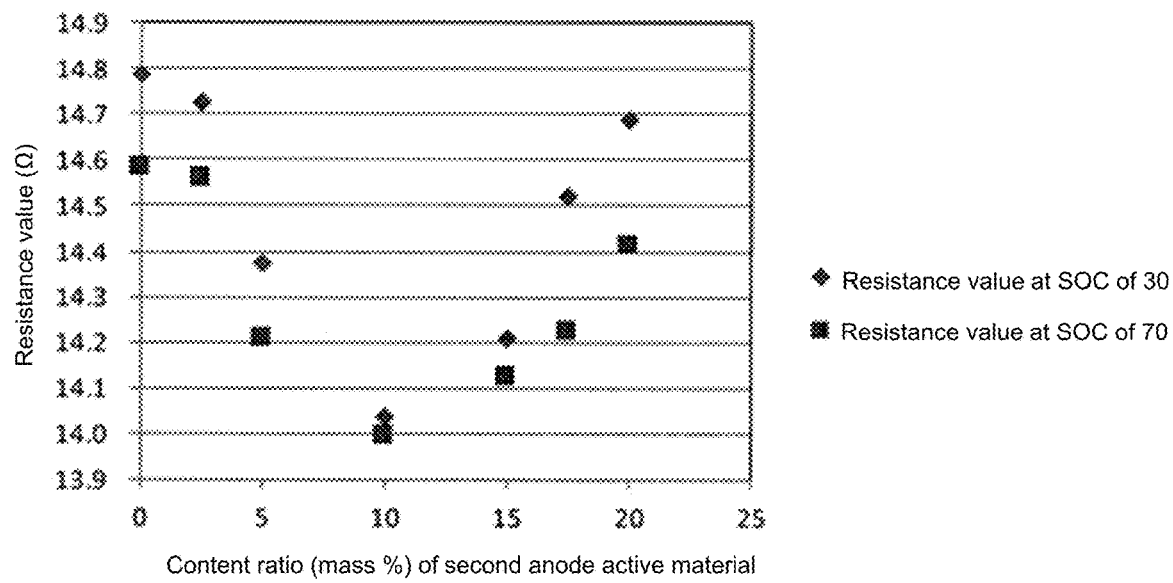
FIG. 3 is a view showing a relationship of battery resistance value to the content ratio of the second anode active material when the total of the mass of the first anode active material contained in the anode mixture and the mass of the second anode active material contained in the anode mixture, is determined as 100 mass %.
Figure 4:
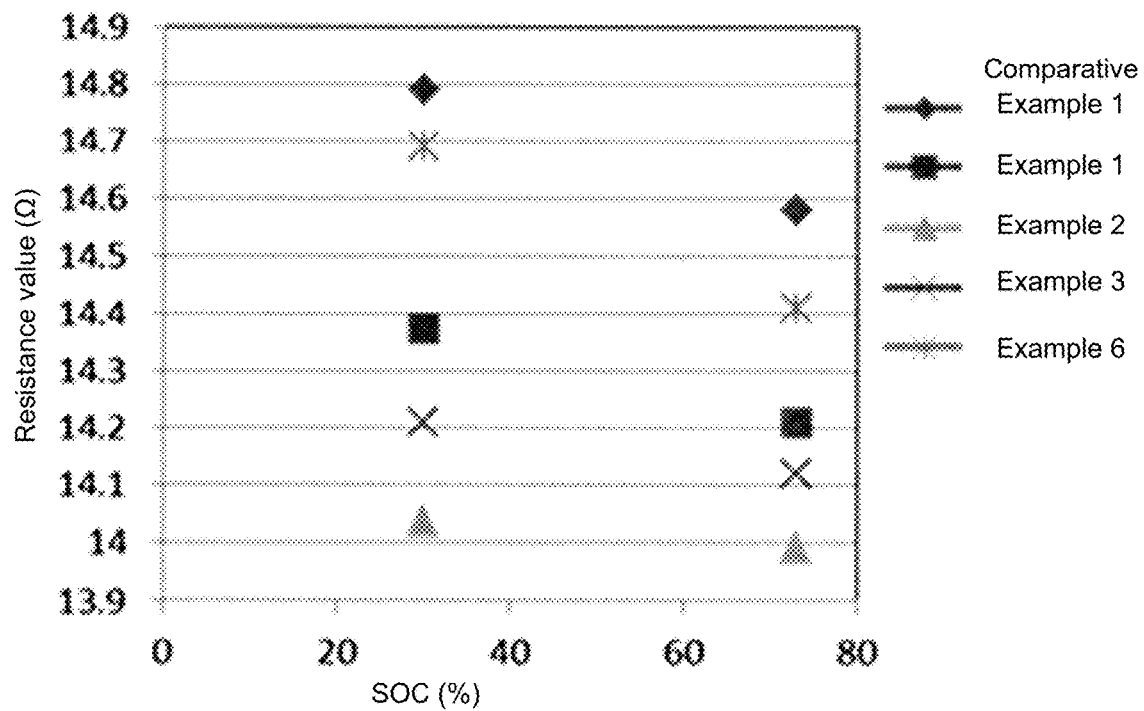
FIG. 4 is a view showing a relationship of battery resistance value to battery SOC.

The results are shown in FIG. 3, FIG. 4 and Table 1.

For the all-solid-state lithium ion secondary batteries (evaluation batteries) of Examples 2 to 6 and Comparative Example 1, the resistance value at a SOC of 30% and the resistance value at a SOC of 70% were obtained in the same manner as Example 1. The results are shown in FIG. 3, FIG. 4 and Table 1.

In the disclosed embodiments, the SOC (state of charge) value means the percentage of the charged capacity with respect to the fully charged capacity of the battery. The fully charged capacity is a SOC of 100%.

[Charging Performance Test]

Then, each evaluation battery was subjected to 30 charge-discharge cycles with constant current and constant voltage (CC-CV) in the following conditions.

Temperature: 25° C.
Charge-discharge rate: 2 C
Battery voltage range: 4.35 V to 3.0 V In the charging performance test, the charged and discharged capacities of each evaluation battery in the first cycle, were measured. Then, the discharged capacity with respect to the charged capacity (discharged capacity/charged capacity) was calculated.

Next, the charged and discharged capacities of each evaluation battery in the 30th cycle, were measured. Then, the discharged capacity with respect to the charged capacity, was calculated.

Figure 5:
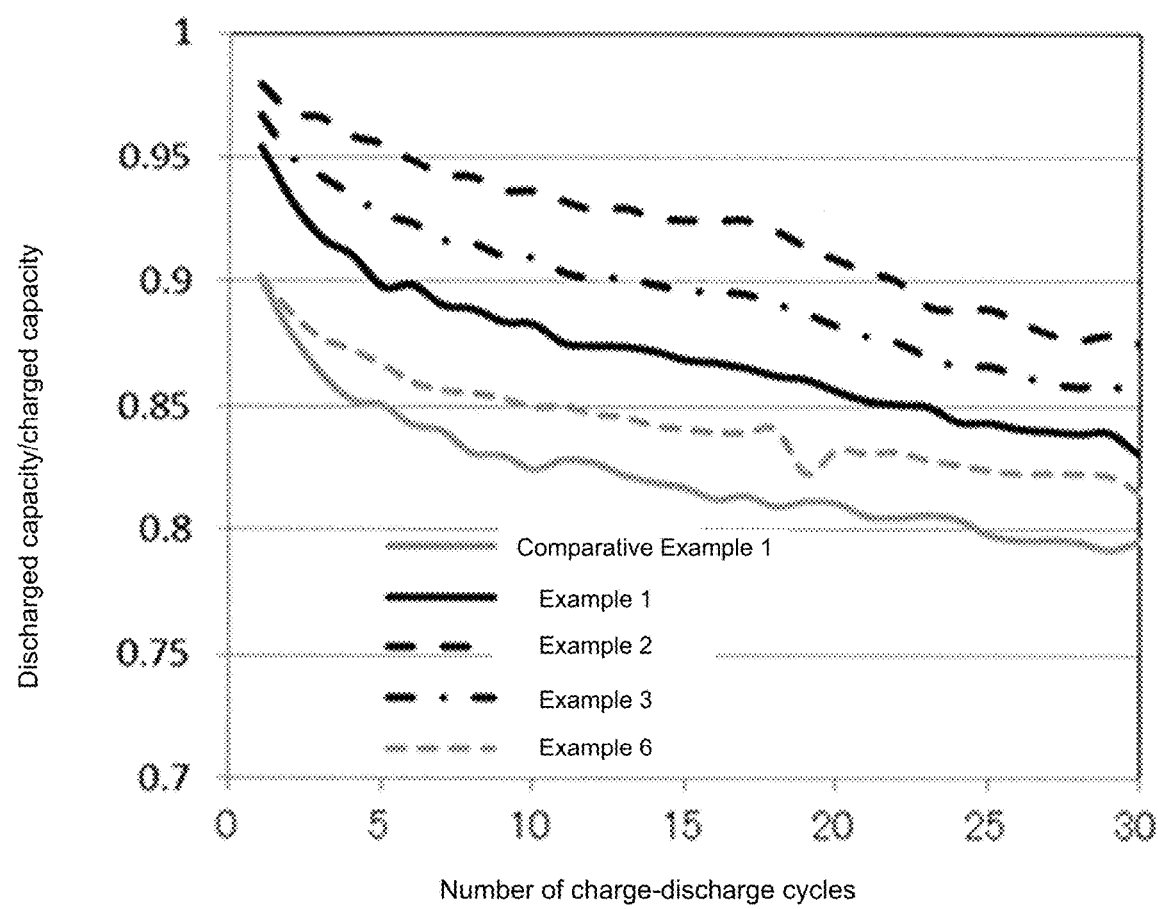
FIG. 5 is a view showing a relationship between battery charge-discharge cycles and discharged capacity with respect to charged capacity.

The results are shown in FIG. 5 and Table 1.

TABLE 1

| | Content ratio (mass %) of second anode active material | Resistance value (Ω) | | Discharged capacity/ charged capacity | |
|---|---|---|---|---|---|
| | | SOC 30% | SOC 70% | In first cycle | In 30th cycle |
| Example 1 | 5 | 14.4 | 14.2 | 0.95 | 0.83 |
| Example 2 | 10 | 14.0 | 14.0 | 0.98 | 0.88 |
| Example 3 | 15 | 14.2 | 14.1 | 0.96 | 0.85 |
| Example 4 | 2.5 | 14.7 | 14.6 | 0.90 | 0.81 |
| Example 5 | 17.5 | 14.5 | 14.2 | 0.92 | 0.82 |
| Example 6 | 20 | 14.7 | 14.4 | 0.90 | 0.82 |
| Comparative Example 1 | 0 | 14.8 | 14.6 | 0.90 | 0.79 |

The resistance value of the battery at a SOC of 30% and the resistance value of the battery at a SOC of 70%, are lower in Examples 1 to 6 than in Comparative Example 1. The discharged capacity with respect to the charged capacity, is higher in Examples 1 to 6 than in Comparative Example 1.

Accordingly, the following was proved: by using, in an all-solid-state battery, the anode mixture in which, when the total of the mass of the first anode active material and the mass of the second anode active material is determined as 100 mass %, the content ratio of the second anode active material is more than 0 mass % and 20 mass % or less, the resistance of the all-solid-state battery is decreased, and the charging performance of the all-solid-state battery is increased.

REFERENCE SIGNS LIST

11. Solid electrolyte layer
12. Cathode mixture layer
13. Anode mixture layer
14. Cathode current collector
15. Anode current collector
16. Cathode
17. Anode
100. All-solid-state battery

The invention claimed is:

1. An anode mixture,
wherein the anode mixture is an anode mixture for an all-solid-state battery comprising an anode comprising an anode mixture layer;
wherein the anode mixture contains a first anode active material and a second anode active material;
wherein a difference between a reaction potential of the first anode active material with respect to lithium metal and a reaction potential of the second anode active material with respect to lithium metal, is 1.0 V or more,
wherein the first anode active material is at least one selected from the group consisting of carbon, Si and Sn;
wherein the second anode active material is $Li_4Ti_5O_{12}$; and
wherein, when a total of a mass of the first anode active material contained in the anode mixture and a mass of the second anode active material contained in the anode mixture is determined as 100 mass % a content ratio of the second anode active material is from 5 mass % to 15 mass %.

2. The anode mixture according to claim 1, wherein the first anode active material is carbon.

3. The anode mixture according to claim 2, wherein the carbon is in the form of carbon particles.

4. The anode mixture according to claim 1, wherein the first and second anode active materials are in a form of anode active material particles.

5. The anode mixture according to claim 4, wherein the average particle diameter ($D_{50}$) of the anode active material particles is 1 nm or more and 100 μm or less.

6. The anode mixture according to claim 4, wherein the average particle diameter ($D_{50}$) of the anode active material particles is 10 nm or more and 30 μm or less.

7. The anode mixture according to claim 1, further comprising a solid electrolyte, an electroconductive material, and a binder.

8. The anode mixture according to claim 1, wherein the difference between the reaction potential of the first anode active material with respect to lithium metal and the reaction potential of the second anode active material with respect to lithium metal, is from 1.0 V to 2.0 V.

9. The anode mixture according to claim 1, wherein the anode mixture is in a form of a paste.

10. The anode mixture according to claim 1, further comprising an electroconductive material selected from the group consisting of a carbonaceous material and a metal material.

11. The anode mixture according to claim 1, further comprising at least one carbonaceous material selected from the group consisting of carbon nanotube (CNT), carbon nanofiber (CNF), and carbon black.

12. The anode mixture according to claim 7, wherein the electroconductive material is at least one carbonaceous material selected from the group consisting of carbon nanotube (CNT), carbon nanofiber (CNF), and carbon black.

13. The anode mixture according to claim 1, further comprising at least one binder selected from the group consisting of acrylonitrile-butadiene rubber (ABR), butadiene rubber (BR), polyvinylidene fluoride (PVdF), and styrene-butadiene rubber (SBR).

14. The anode mixture according to claim 7, wherein the binder is at least one selected from the group consisting of acrylonitrile-butadiene rubber (ABR), butadiene rubber (BR), polyvinylidene fluoride (PVdF), and styrene-butadiene rubber (SBR).

15. The anode mixture according to claim 1, further comprising at least one selected from the group consisting of an oxide-based solid electrolyte and a sulfide-based solid electrolyte.

16. The anode mixture according to claim 7, wherein the solid electrolyte is at least one selected from the group consisting of an oxide-based solid electrolyte and a sulfide-based solid electrolyte.

17. The anode mixture according to claim 1, further comprising at least one solid electrolyte selected from the group consisting of $Li_2S$-$P_2S_5$, $Li_2S$-$SiS_2$, $LiX$-$Li_2S$-$SiS_2$, $LiX$-$Li_2S$-$P_2S_5$, $LiX$-$Li_2O$-$Li_2S$-$P_2S_5$, $LiX$-$Li_2S$-$P_2O_5$, $LiX$-$Li_3PO_4$-$P_2S_5$, and $Li_3PS_4$, wherein X is a halogen.

18. The anode mixture according to claim 1, further comprising at least one solid electrolyte selected from the group consisting of $Li_{6.25}La_3Zr_2Al_{0.25}O_{12}$, $Li_3PO_4$, and $Li_{3+x}PO_{4-x}N_x$.

19. The anode mixture according to claim 7, wherein the solid electrolyte is at least one selected from the group consisting of $Li_2S$-$P_2S_5$, $Li_2S$-$SiS_2$, $LiX$-$Li_2S$-$SiS_2$, $LiX$-$Li_2S$-$P_2S_5$, $LiX$-$Li_2O$-$Li_2S$-$P_2S_5$, $LiX$-$Li_2S$-$P_2O_5$, $LiX$-$Li_3PO_4$-$P_2S_5$, and $Li_3PS_4$, wherein X is a halogen.

20. The anode mixture according to claim 7, wherein the solid electrolyte is at least one selected from the group consisting of $Li_{6.25}La_3Zr_2Al_{0.25}O_{12}$, $Li_3PO_4$, and $Li_{3+x}PO_{4-x}N_x$.

\* \* \* \* \*